US006243152B1

(12) United States Patent
Knox et al.

(10) Patent No.: US 6,243,152 B1
(45) Date of Patent: *Jun. 5, 2001

(54) CONTRAST POLYMER DISPERSED LIQUID CRYSTAL PROJECTION DISPLAY SYSTEM

(75) Inventors: Richard M. Knox, Houston; Mehdi Zeinali, Spring, both of TX (US)

(73) Assignee: Duke University, Durham, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,794

(22) Filed: Dec. 17, 1996

(51) Int. Cl.[7] ......................... G02F 1/1333; G02F 1/1335
(52) U.S. Cl. .................................. 349/86; 349/10; 349/96; 349/9
(58) Field of Search .................................. 349/8, 10, 86, 349/96, 9

(56) References Cited

U.S. PATENT DOCUMENTS

| 4,799,137 | 1/1989 | Aho | 362/309 |
|---|---|---|---|
| 4,874,228 | 10/1989 | Aho et al. | 350/345 |
| 5,054,885 | 10/1991 | Melby | 359/618 |
| 5,083,857 | 1/1992 | Hornbeck | 359/291 |
| 5,122,905 | 6/1992 | Wheatley et al. | 359/586 |
| 5,122,906 | 6/1992 | Wheatley | 359/586 |
| 5,148,157 | 9/1992 | Florence | 340/783 |
| 5,190,370 | 3/1993 | Miller et al. | 362/340 |
| 5,225,823 | 7/1993 | Kanaly | 340/793 |
| 5,233,385 | 8/1993 | Sampsell | 355/35 |
| 5,303,073 | * 4/1994 | Shirota et al. | 349/86 |
| 5,313,479 | 5/1994 | Florence | 372/26 |
| 5,333,021 | * 7/1994 | Mitsutake et al. | 349/10 |
| 5,381,309 | 1/1995 | Borchardt | 362/31 |
| 5,404,076 | 4/1995 | Dolan | 313/572 |
| 5,404,171 | 4/1995 | Golstein et al. | 348/459 |

(List continued on next page.)

FOREIGN PATENT DOCUMENTS

95/1762 * 6/1995 (WO).

OTHER PUBLICATIONS

Baur, T. et al., "High Performance Liquid Crystal Device Suitable for Projection Display," SPIE vol. 2650, pp. 226–228 (Jul. 1996).

Displaytech, Inc., "FLC/VLSI Display Technology" (Dec. 1, 1995).

Gambogi, W., et al., "HOE Imaging in DuPont Holographic Photopolymers," Proc. SPIE, "Diffractive and Holographic Optics Technology," vol. 2152 (1994), p. 282–293.

Gambogi, W.J. et al., "Advances and Applications of DuPont Holographic Photopolymers," SPIE vol. 2043, "Holographic Imaging and Materials" (Aug. 1993), p. 2–13.

Gambogi, W.J. et al., "Color Holography Using DuPont Holographic Recording Films," Proc. SPIE, "Holographic Materials," vol. 2405 (Feb. 1995), p. 67–73.

(List continued on next page.)

Primary Examiner—William L. Sikes
Assistant Examiner—Toan Ton
(74) Attorney, Agent, or Firm—Fleshner & Kim, LLP

(57) ABSTRACT

A polymer dispersed liquid crystal projection display is provided that has enhanced contrast. In the projection system using a polymer dispersed liquid crystal display (PDLC), polarized light is used as the light source onto the PDLC. The reflected light maintains its polarization, while the scattered light from the off pixels of the PDLC randomize the polarization. The polarized image is then passed through a polarizing filter which eliminates half of the scattered light, whereas practically all of the polarized image is passed onto the display source. In this way, the contrast between the on and off pixels is effectively doubled.

30 Claims, 5 Drawing Sheets

U.S. PATENT DOCUMENTS

| | | | | |
|---|---|---|---|---|
| 5,404,175 | * | 4/1995 | Nagae et al. | 349/10 |
| 5,416,618 | | 5/1995 | Juday | 359/53 |
| 5,440,197 | * | 8/1995 | Gleckman | 349/13 |
| 5,453,859 | | 9/1995 | Sannohe et al. | 359/63 |
| 5,467,146 | | 11/1995 | Huang et al. | 348/743 |
| 5,471,584 | | 11/1995 | Blaxtan et al. | 359/263 |
| 5,486,949 | | 1/1996 | Schrenk et al. | 359/498 |
| 5,504,391 | | 4/1996 | Turner et al. | 313/570 |
| 5,508,841 | | 4/1996 | Lin et al. | 359/318 |
| 5,523,881 | | 6/1996 | Florence et al. | 359/561 |
| 5,555,324 | | 9/1996 | Waxman et al. | 382/254 |
| 5,606,220 | | 2/1997 | Dolan et al. | 313/637 |
| 5,612,820 | | 3/1997 | Schrenk et al. | 359/498 |
| 5,617,226 | * | 4/1997 | Ohmae et al. | 349/10 |
| 5,626,800 | | 5/1997 | Williams et al. | 264/1.38 |
| 5,642,129 | | 6/1997 | Zavracky et al. | 345/100 |
| 5,670,842 | | 9/1997 | Dolan et al. | 313/570 |
| 5,682,080 | | 10/1997 | Dolan et al. | 313/570 |
| 5,686,793 | | 11/1997 | Turner et al. | 313/570 |
| 5,760,860 | * | 6/1998 | Mason et al. | 349/86 |
| 5,808,794 | * | 9/1998 | Weber et al. | 349/97 |
| 5,833,360 | * | 11/1998 | Knox et al. | 362/293 |

OTHER PUBLICATIONS

Gambogi, W.J. et al., "Diffractive Printing Methods Using Volume Holograms," IS&T/SPIE 1993 Int'l Conf. on Electronic Imaging, conf. 1914 (1993).

Gambogi, W.J. et al., "Holographic Transmission Elements Using Improved Photopolymer Films," SPIE vol. 1555 Computer and Optically Generated Holographic Optics (Fourth in a Series), pp. 256–266 (1991).

Handbook of Optics, vol. II, Devices, Measurements, and Properties, "Chapter 3—Polarizers".

Jack M. Younse, "Projection Display Systems Based on the Digital Micromirror Device (DMD)," SPIE Proceedings Reprint, vol. 2641, pp. 64–75 (Jul. 1995).

Larry J. Hornbeck, "Digital Light Processing and MEMS: Timely Convergence for a Bright Future,"presented at Micromachining and Microfabrication '95 (Oct. 23–24, 1995).

Parfenov, A.V. and Putilin, A.N., "Advanced Optical Schemes with Liquid Crystal Image Converters for Display Applications,"SPIE vol. 2650, pp. 173–179 (Jul. 1996).

Tipton, D. et al., "Improved Process of Reflection Holography Replication and Heat Processing," Proc. SPIE, "Practical Holography VIII, Materials and Processing," vol. 2176 (Feb. 1994) p. 172–183.

Weber, A.M. et al., "Hologram Recording in DuPont's New Photopolymer Materials," Practical Holography IV, SPIE OE/Lase/Conference Proceedings, 1212–04 (Jan. 1990), p. 30–39.

* cited by examiner

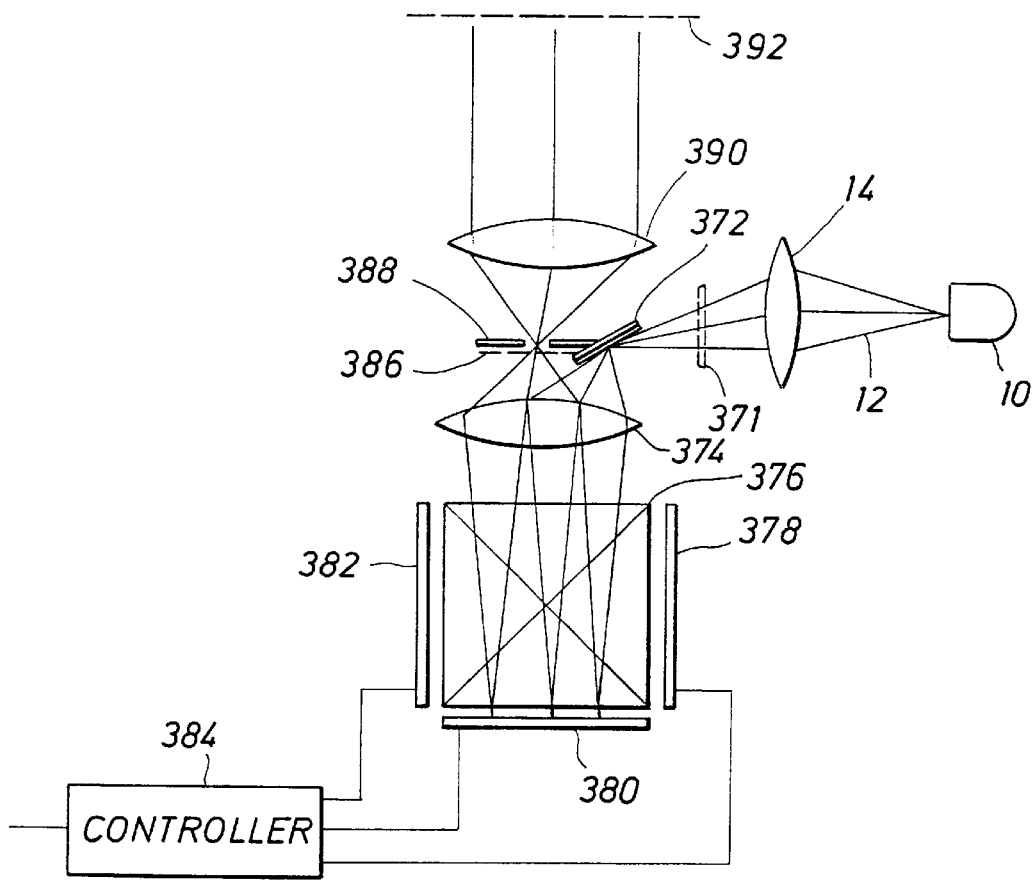
FIG. 9
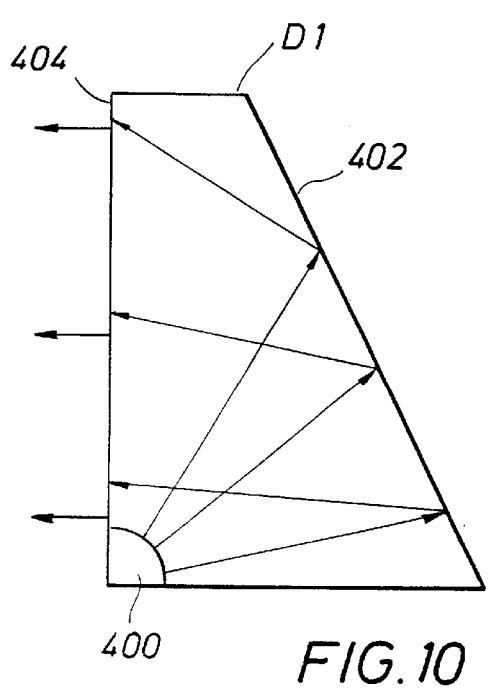
FIG. 10
FIG. 11

CONTRAST POLYMER DISPERSED LIQUID CRYSTAL PROJECTION DISPLAY SYSTEM

BACKGROUND OF THE INVENTION

1. Field of the Invention

The invention relates to projection displays, and more particularly to an improved contrast polymer dispersed liquid crystal display projection system.

2. Description of the Related Art

The cathode ray tube (CRT) has for many years been the cornerstone of computer and television display technology. It is not without its drawbacks. Larger sizes necessarily require larger vacuum tubes, more powerful magnets, and other components which increase in cost at a greater rate than the size of the display. It is not possible to make an arbitrarily large CRT display.

Because the display now represents a significant percentage of the cost of computer systems, and because the need for larger displays has increased with the graphical user interfaces that now prevail, alternatives to the CRT are very desirable.

A number of such alternatives have been developed. One technology is the liquid crystal display (LCD), which when used in a flat panel system presents a number of advantages over CRTs. But again, LCDs cannot be made arbitrarily large because of manufacturing limitations.

One promising technology involves projection displays. Projection televisions are well known, but have typically required three projection engines, one for each color. They do present the advantage, however, that an arbitrarily large surface can be used as the display surface, dependent on the intensity of the light source and optics of the projection system. That is, for large screens, projection display systems present unique advantages.

One type of projection system that has been developed employs polymer dispersed liquid crystals (PDLCs). Such liquid crystals have a polymer matrix that includes bubbles of liquid crystal. If no field is applied, the liquid crystal bubbles take on many different orientations. Because at least one of the indices of refraction of the liquid crystal differs from the index of refraction of the polymer, incoming light will be scattered.

If an electric field is applied, the liquid crystal bubbles will instead align with the field. If the materials are carefully controlled so the index of refraction of the liquid crystal for light polarized perpendicular to the electric field direction matches the index refraction of the polymer, then light will propagate through the material without being reflected and scattered by the bubbles.

A PDLC is typically provided with a reflective backing, and is used to reflect an intense light source when energized. Such a system is illustrated in FIG. 1. As is discussed below, in such a system, a light source is collimated onto the PDLC, which when fully energized passes the collimated light. The passed light is reflected by the backing, refocused through a pinhole aperture, and transmitted to the display surface. When the PDLC is not energized, the collimated light is instead scattered, so that very little light is reflected and refocused through the pinhole aperture onto the display. PDLC display systems are generally disclosed and discussed in U.S. Pat. No. 5,404,171 to Nague, et al., issued Apr. 4, 1995, which is hereby incorporated by reference. However, PDLC-based projection systems have a relatively low contrast ratio, at least because some of the scattered light will be transmitted through the pinhole aperture. Improvement of the contrast ratio of PDLC-based projection systems is desirable.

SUMMARY OF THE INVENTION

According to the invention, a method and apparatus is provided for creating a high contrast image for a projection display. A source of polarized light is provided to a polymer dispersed liquid crystal. The polymer dispersed liquid crystal reflects a polarized image. Those portions of the polymer dispersed liquid crystal that are not energized instead scatter the light, in the process randomizing the polarity of that scattered light. The polarized image is then transmitted to the display screen, but in the process is first passed through a polarizing film that only transmits light of the polarity of the polarized image. By passing through the polarized film, half of the scattered light is eliminated, because its polarity has been randomized. Therefore, substantially all of the polarized image is transmitted to the display, but half of the scattered light is eliminated, thus doubling the contrast of the display.

In alternative embodiments, a projection system is provided where polarized light is first passed through a collimating lens onto the PDLC at a slight offset, and the returned image passes through the same collimating lens, but aligned with an aperture. It is passed through the aperture and then focused onto the display screen. In this embodiment, a polarizing filter is placed in the light path between the display screen and the collimating lens.

In other alternative embodiments, the polarized light is provided by a lamp that emits only polarized light, or is instead provided by a reflecting film that reflects the light from the lamp to the collimating lens. In this latter embodiment, the reflecting film is polarity specific and only reflects light of a first polarity to the collimating lens and transmits the remainder of the light.

In further alternative embodiments, a reflecting polarizing film reflects polarized light to the polymer dispersed liquid crystal display. A retarder is provided in the path between the reflecting polarizing film and the polymer dispersed liquid crystal, so that the polarity of the image is shifted by an appropriate amount such that the image is then transmitted back through the polarizing film. Alternatively, the polarizing film can pass the initial light and reflect the polarized image. As a further alternative, an elementless lamp (or other lamp capable of reabsorbing and reemitting light) can be used as a light source, and the light of the unused polarization reflected back to the elementless lamp for reabsorption and reemission.

BRIEF DESCRIPTION OF THE DRAWINGS

A better understanding of the present invention can be obtained when the following detailed description of the preferred embodiment is considered in conjunction with the following drawings, in which:

FIG. 9 is an alternative embodiment of a color high contrast polymer dispersed liquid crystal projection engine according to the invention; and FIGS. 10 and 11 are diagrams illustrating typical projection systems in which the high contrast polymer dispersed liquid projection engine would be used.

DETAILED DESCRIPTION OF THE PREFERRED EMBODIMENT

Additional background for projection systems can be found in U.S. patent application Ser. Nos. 08/581,108, entitled "Projecting Images," to Knox, filed Dec. 29, 1995; 08/747,190, entitled "High Efficiency Lamp Apparatus for Producing a Beam of Polarized Light," to Knox, et al., filed Nov. 12, 1996; and 08/730,818, entitled "Image Projection System Engine Assembly," to Knox, filed Oct. 17, 1996, which are incorporated herein by reference.

Figure 1A:
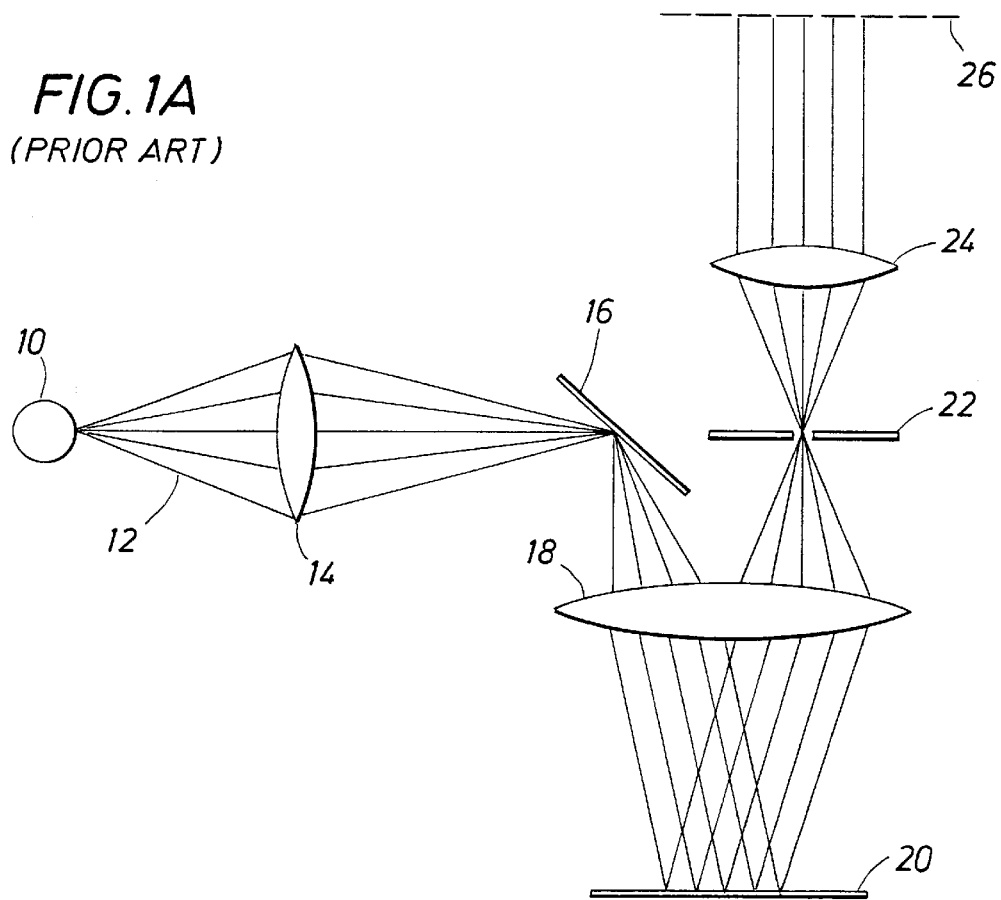
FIG. 1A is an illustration of a typical prior art polymer dispersed liquid crystal projection system.

Turning to FIG. 1A, illustrated is a typical prior art polymer dispersed liquid crystal projection system in which a light source 10 provides light 12 focused by a focusing lens 14 onto a reflecting surface 16. The reflected light from the reflecting surface 16, now diverging, is collimated by a collimating lens 18. This collimated light is provided to a polymer dispersed liquid crystal (PDLC) 20. The PDLC 20 reflects an image back to the collimating lens 18. In doing so, however, the resultant image is focused at a different point than the light originally reflected by the reflecting surface 16. Preferably, the reflecting surface 16 is set at such an angle that the reflected image from the PDLC 20 is refocused at an aperture 22 by the collimating lens 18. After passing through this aperture 22 (formed, for example, by a mask), the image is then passed through a focusing lens 24, and onto a projection surface 26.

Figure 1B:
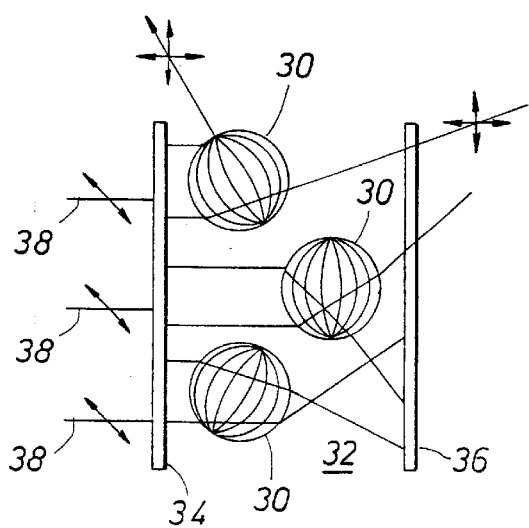
FIG. 1B is an illustration of the typical prior art internal structure of a polymer dispersed liquid crystal.

To better understand this system, an understanding of PDLCs is helpful. Referring to FIG. 1B, shown is the typical internal structure of a polymer dispersed liquid crystal. Small bubbles 30 of liquid crystal are formed within a polymer matrix 32 between two electrodes 34 and 36. When the electrodes are not energized, the alignment of the liquid crystals within the bubbles 30 is random. Light 38, here shown as polarized for illustrative purposes, enters the polymer matrix 32, but is reflected, or scattered, at random directions by the liquid crystals within the bubbles 30. Further, this reflected light has randomized polarity. (Although the system shown in FIG. 1A does not employ polarity, the importance of polarity of the incident light will be appreciated below.)

Figure 1C:
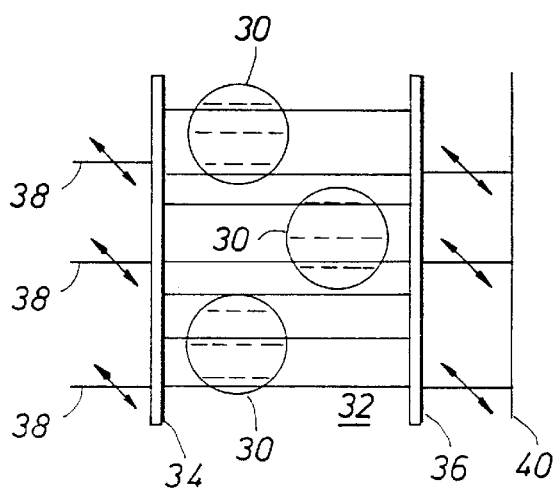
FIG. 1C is an illustration of the same polymer dispersed liquid crystal of FIG. 1B with voltage applied between the electrodes.

Referring to FIG. 1C, shown is the same PDLC, but now with a voltage applied between the electrodes 34 and 36. In this case, rather than the light being randomly scattered, the light passes through the polymer matrix 32 unaffected, because the liquid crystals within the bubbles 30 are now aligned in the direction of the transmitted light 38. In typical applications, this transmitted light is then reflected back through the polymer matrix 32. The PDLC 20 of FIG. 1A has a reflective backing 40 to achieve this reflection. In such a system, when the PDLC 20 is energized, the light passed by the collimating lens 18 to the PDLC 20 is reflected back to the collimating lens 18 and to the aperture 22. When a pixel in the PDLC 20 is not energized, the light from the collimating lens 18 is randomly scattered by the PDLC 20. Only a very small portion of that scattered light is returned through the aperture 22. Thus, in reverse from a typical surface display, an energized portion transmits light, while a non-energized portion appears dark on the projection surface 26.

Figure 2:
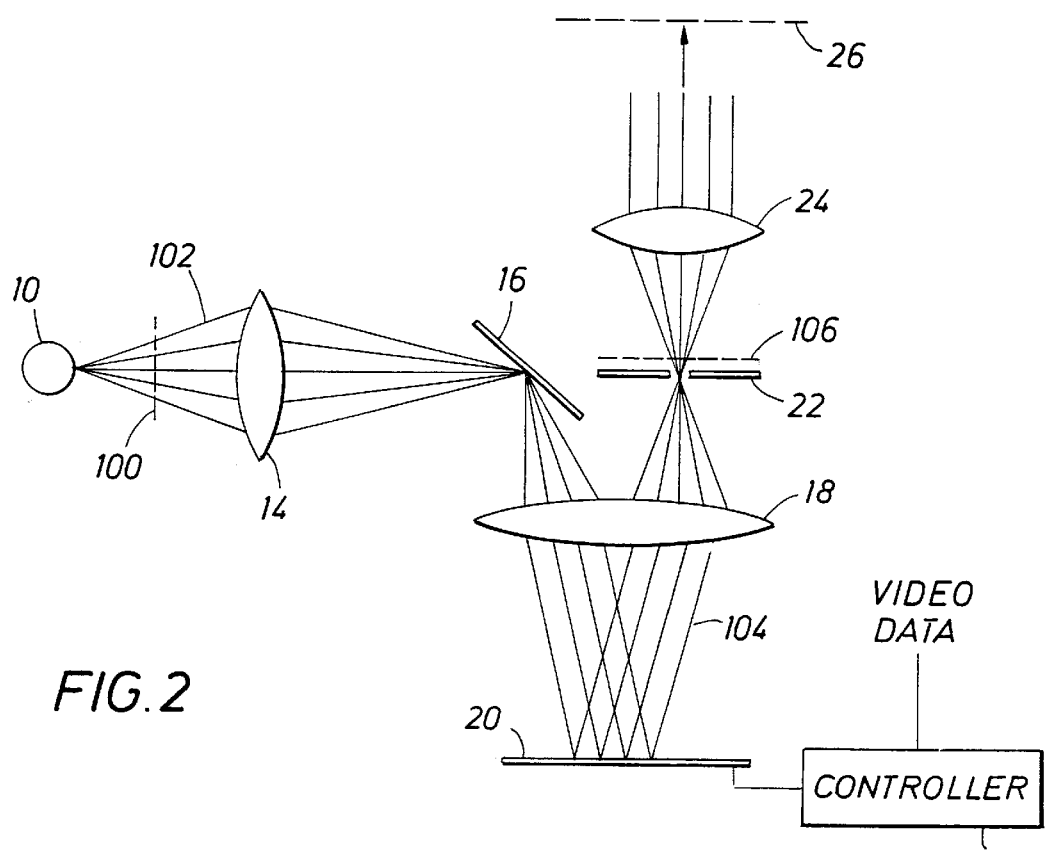
FIG. 2 is a block diagram illustrating a first embodiment of the high contrast polymer dispersed liquid crystal projection system according to the invention.

With this understanding, FIG. 2 illustrates a polymer dispersed liquid crystal display system according to the invention with increased contrast. The system is similar to that of FIG. 1A, with a light source 10, a lens 14, a reflective surface 16, a collimating lens 18, a PDLC 20, an aperture 22, a focusing lens 24, and a projection surface 26. In this case, however, light from the light source 10 is first polarized by being passed through a polarizing filter 100. This polarized light 102 is then transmitted and focused by the lens 14 on the reflective surface 16, through the collimating lens 18, and to the polymer dispersed liquid crystal 20. The reflected image is a polarized image 104. This polarized image 104 is focused by the collimating lens 18 onto the aperture 22, but is additionally passed through a second polarizing filter 106 before being transmitted through the focusing lens 24 and to the projection surface 26.

The effect of this polarization will be appreciated in conjunction with FIGS. 1B and 1C. For pixels whose light should be transmitted to the projection surface 26, the light 102 which is polarized is reflected off of the backing of the polymer dispersed liquid crystal 20 and through the collimating lens 18 as the polarized image 104 with its polarity intact. That is, the polarized image 104 is of substantially the same polarity as the polarized light 102. Thus, if the polarizing filter 106 is properly oriented, virtually all of the polarized image 104 is transmitted to the projection surface 26.

Pixels of light which should not be transmitted to the projection surface 26, however, are further blocked in the system of FIG. 2. For such pixels, the polarized light 102 is passed through the collimating lens 18, but when that light 102 strikes the polymer dispersed liquid crystal 20, it is not only scattered, out its polarity is also randomized (see FIG. 1B). Effectively, about half of the scattered light is converted to a polarity other than that of the polarized light 102. Therefore, of the small amount of scattered light that is focused onto the aperture 22, half of that light is further filtered out by the polarizing filter 106.

It is this scattered light which decreases contrast. Although very little of the scattered light, even in the system of FIG. 1A, is transmitted through the aperture 22, the proportion of light reflected to the aperture 22 by a fully-on pixel relative to the proportion of scattered light transmitted by a fully-off pixel constitutes the contrast of the display system. Because the filter 106 reduces the amount of scattered light transmitted through the aperture 22 by half, the contrast is doubled.

Also shown in FIG. 2 is a controller 108. This controller 108 is illustrated as receiving video data from a video source, such as a computer, and providing the appropriate control for the polymer dispersed liquid crystal 20. Such controllers are well known to the art, and it will be appreciated that through the controller 108 receiving video data, an appropriate image can be displayed on the projection surface 26 but with enhanced contrast.

It will also be appreciated with reference to FIG. 2 that it is not critical precisely where the polarization of the initial light 102 occurs and where the filtering of the polarized image 104 occurs. As long as the image 104 is a polarized image, by then filtering that polarized image through a polarizing filter, the contrast is enhanced because half of the scattered light is filtered out.

Figure 3:
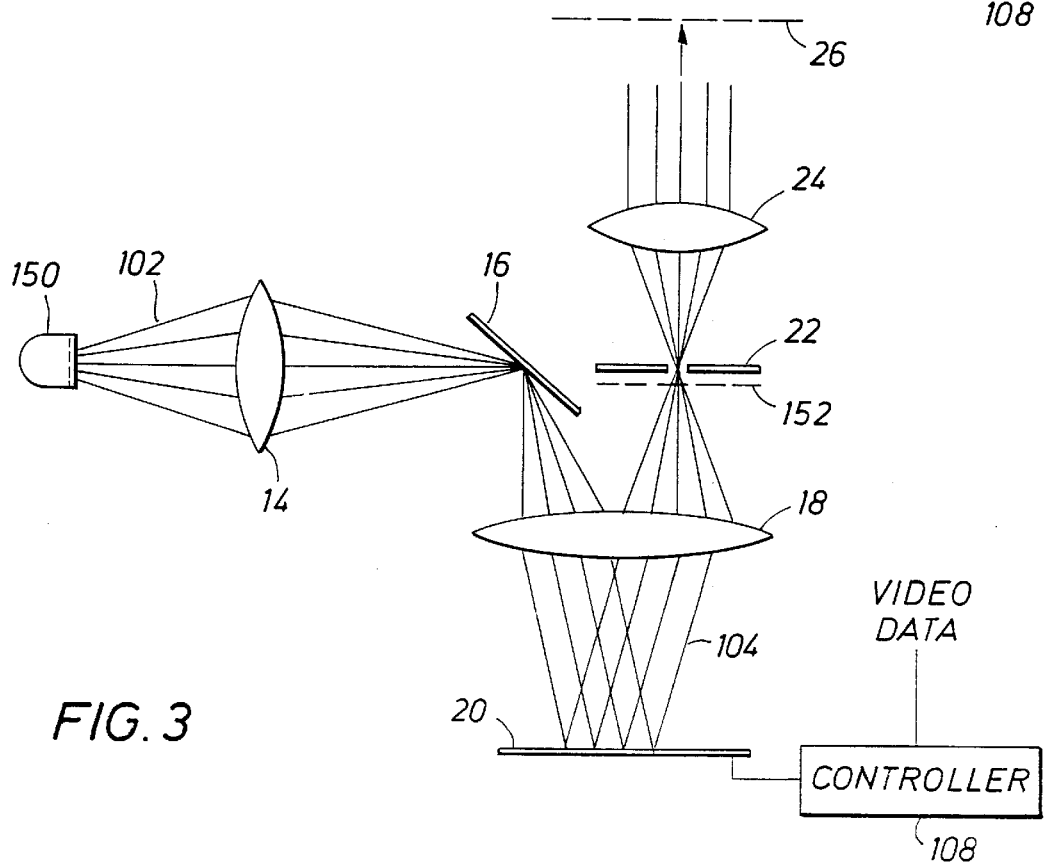
FIG. 3 is a second embodiment of a high contrast polymer dispersed liquid crystal projection engine according to the invention.

Turning to FIG. 3, an alternative location for the source of the polarized light is illustrated. This system is effectively the same as that of FIG. 2, but in this system a different lamp 150 is employed. The lamp 150 only transmits light of a certain polarity. Such a lamp is illustrated, for example, in the previously incorporated application entitled "High Efficiency Lamp Apparatus for Producing a Beam of Polarized Light." Such a lamp, employing a sulfur, selenium, or other gas, reabsorbs light of the wrong polarity and then reemits that light. Such a lamp has higher efficiency, and the unneeded polarity of light is not wasted.

Further, FIG. 3 shows an alternative position for the filter 106, here shown as the polarizing filter 152 located between the aperture 22 and collimating lens 18. This illustrates how the precise placement of the polarizing filter 152 or 106 is not critical.

Figure 4:
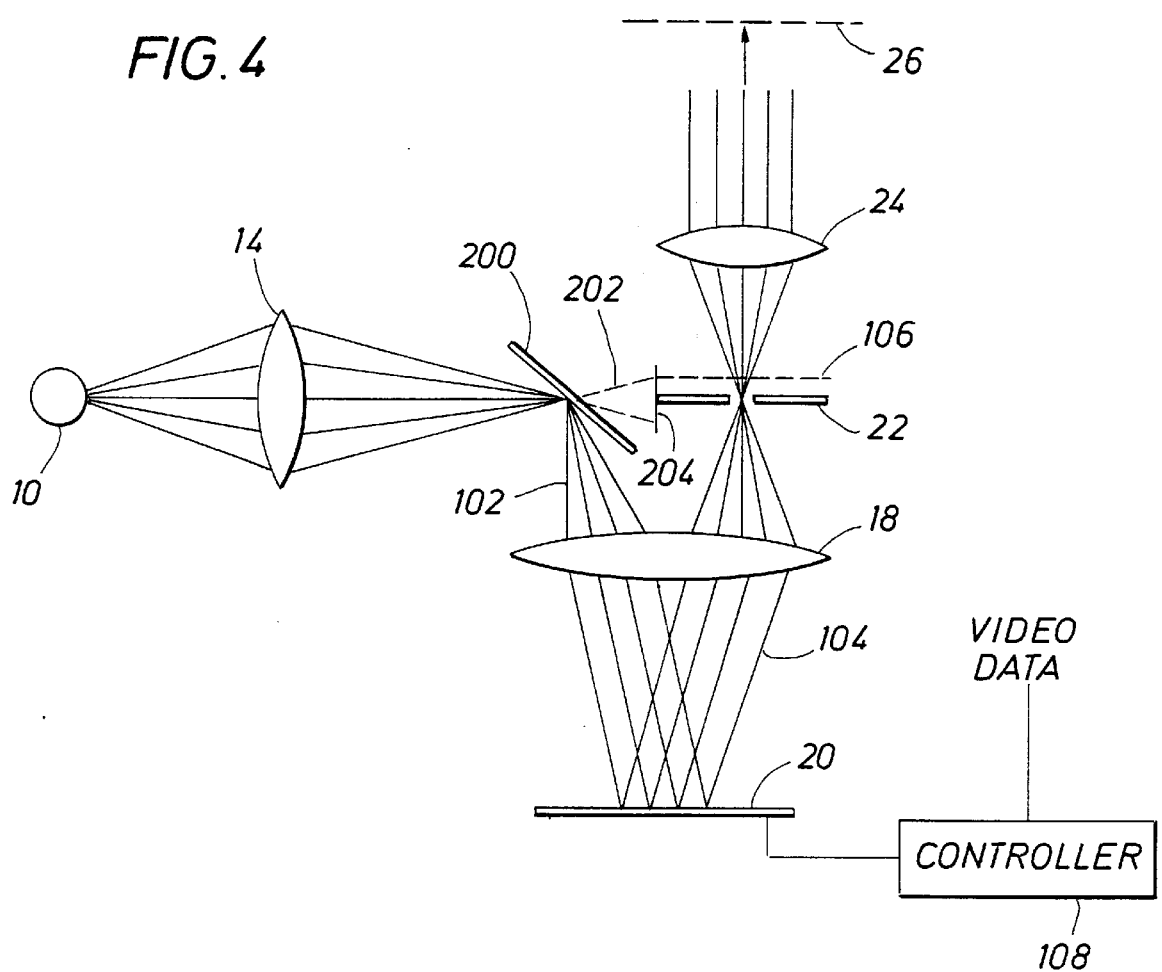
FIG. 4 is a third embodiment of a high contrast polymer dispersed liquid crystal projection engine according to the invention.

Turning to FIG. 4, shown is another alternative embodiment of the system of FIGS. 2 and 3. In this embodiment, the reflecting surface 16 is replaced with a polarizing reflecting surface 200. A suitable material for such a reflector 200 (as well as the other polarizing filters in the system) is DBEF, or double brightness enhancement film, manufactured by Minnesota Mining and Manufacturing of Minneapolis, Minn. The polarized light 102 is created by the reflecting surface 200 rather than at the lamp 150 or by the filter 100. Thus, light 202 of unneeded polarity is transmitted through the polarizing reflecting surface 200. This light could further be reflected back by a reflector 204, which would return the light to the lamp 10, but this is only advisable if the lamp 10 is a lamp that is capable of reabsorbing and retransmitting light.

It will be appreciated that the optics of FIGS. 2–4 have been simplified, and other components such as retarders and lenses might be necessary. Further, it will be appreciated that wide variety of other optical paths could be provided, as long as polarized light is provided to the polymer dispersed liquid crystal 20 and then that polarized image is filtered through a polarizing filter. Through this technique, the effective contrast is doubled.

Figure 5:
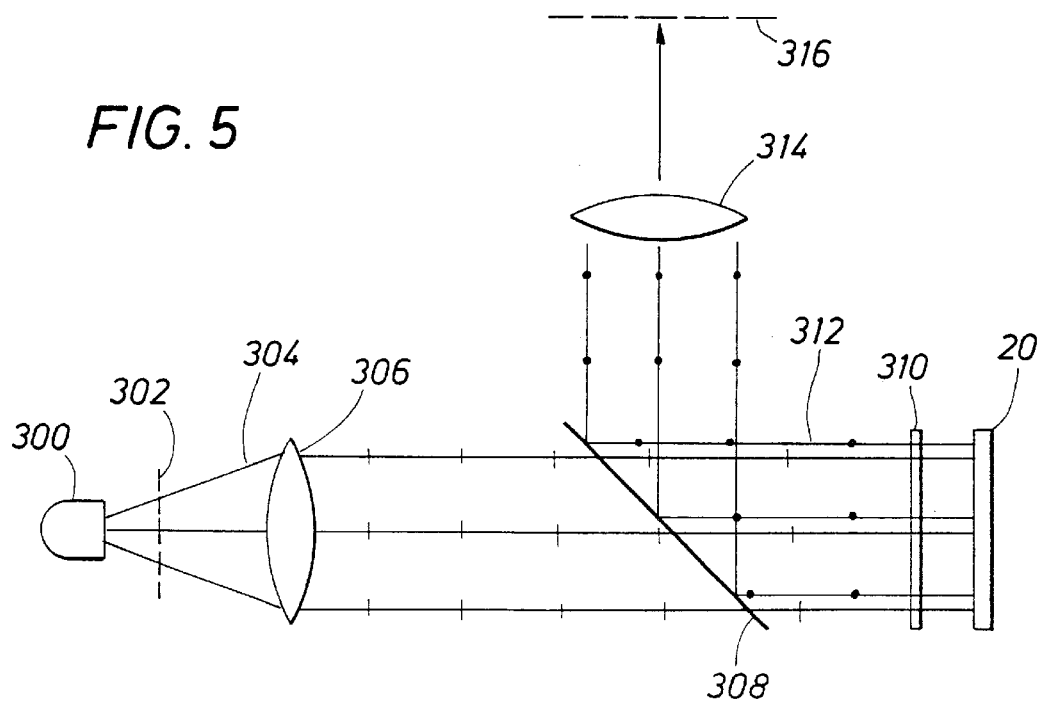
FIG. 5 is a fourth embodiment of a high contrast polymer dispersed liquid crystal projection engine according to the invention.
Figure 6:
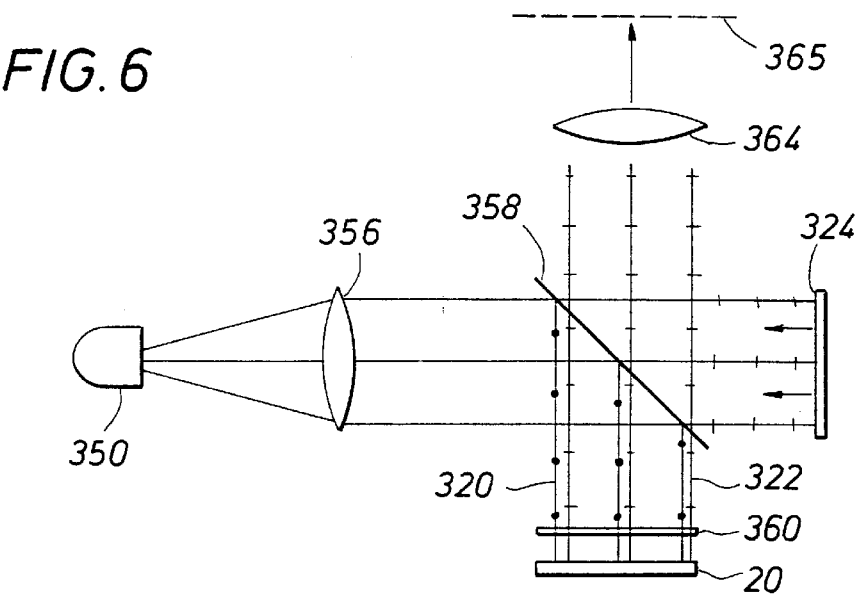
FIG. 6 is a fifth embodiment of a high contrast polymer dispersed liquid crystal projection engine according to the invention.

Turning to FIGS. 5 and 6, shown are alternative embodiments in which the collimating lens 18 and the aperture 22 are eliminated. Beginning with FIG. 5, shown is a lamp 300 which transmits unpolarized light that is then polarized by a filter 302 yielding polarized light 304. This polarized light is then focused by a lens 306 such that the polarized light travels through a polarizing reflecting surface 308 onto the polymer dispersed liquid crystal 20. First, however, that light is passed through a retarder 310, which preferably shifts the polarization by about 90°. On the return path, the polarized image from the polymer dispersed liquid crystal 20 is retarded by another 90° by the retarder 310, such that a polarized image 312 passed through the retarder 310, has a polarity 180° rotated from the polarity of the polarized light 304. This light is substantially reflected by the polarizing reflecting surface 308, so that the image is projected through a lens 314 and onto a projection surface 316.

It will be appreciated that scattered light from the polymer dispersed liquid crystal 20 again is reduced by half by the polarizing reflecting surface 308. The polarizing reflecting surface 308 could be, for example, double brightness enhancement film, or DBEF.

A number of permutations of this arrangement are also possible. One is shown in FIG. 6, which employs a number of differences from the embodiment of FIG. 5. In FIG. 6, a lamp 350 is preferably a lamp that is capable of reabsorbing and reemitting light as discussed previously. A lens 356 focuses unpolarized light onto polarizing reflecting film 358. In this case, the polarizing reflecting film 358 itself is used to create polarized light 320, which is then transmitted through a retarder 360 and on to the polymer dispersed liquid crystal 20. After again passing through the retarder 360, a resulting image 322 passes through the polarizing reflecting film 358 as the image, again through a focusing lens 364 and on to a projection screen 366. In this case, half of the scattered light is reflected by the polarizing reflecting film 358, again increasing contrast.

Further shown in FIG. 6, half of the unpolarized light from the lamp 350 is passed through the reflecting film 358. In this case, rather than simply discarding that light, it is reflected by a reflector 324. This reflected light is transmitted back through the polarized reflecting film 358, through the lens 356, and back to the lamp 350. This configuration is possible if the lamp 350 is capable of reabsorbing that reflected light. This increases the efficiency of the lamp 350 because half of the light which is unusable is thus reflected back to the lamp 350 for reabsorption and reemission.

Figure 7:
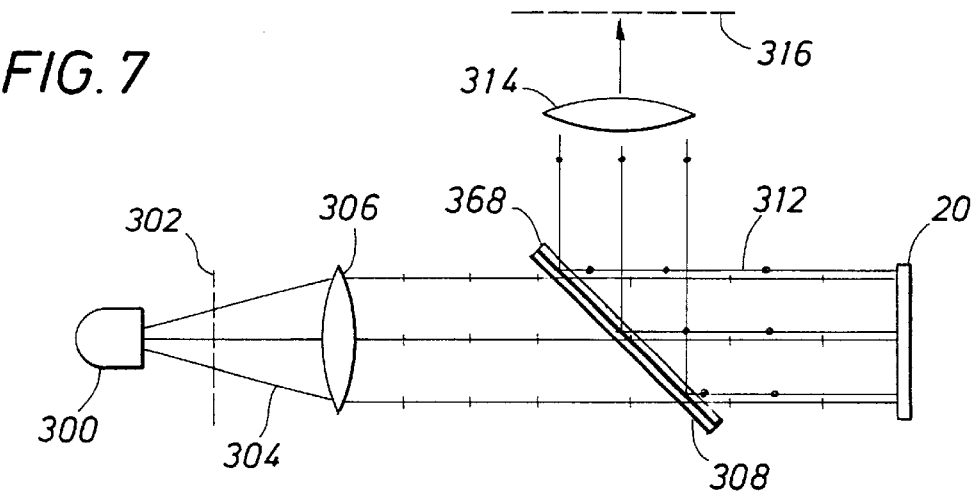
FIGS. 7 and 8 are alternative embodiments of the embodiments of FIGS. 5 and 6.
Figure 8:
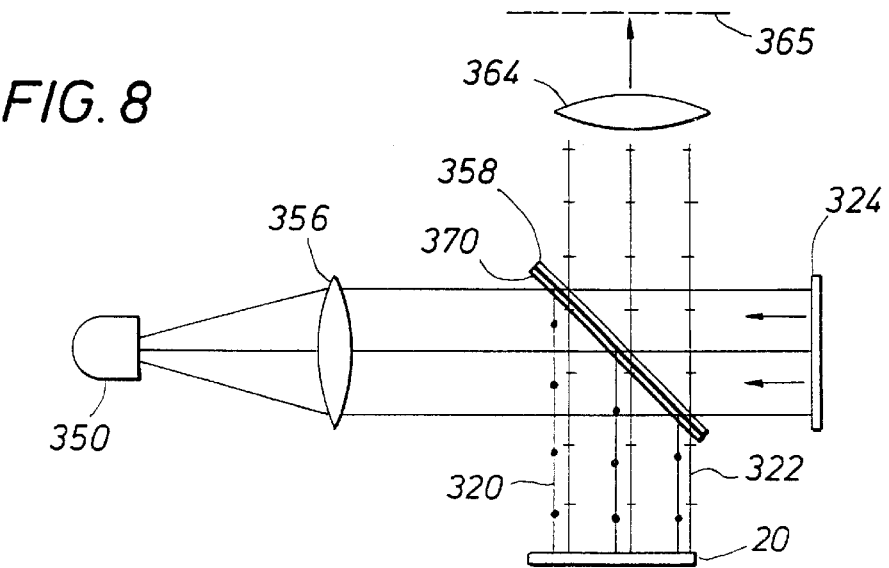

FIGS. 7 and 8 are alternative embodiments corresponding respectfully to FIGS. 5 and 6, but with the retarders 310 and 360 relocated respectively as retarders 368 and 370. These positions should provide less leakage, but otherwise the embodiments of FIGS. 7 and 8 operate similar to those of FIGS. 5 and 6.

FIG. 9 illustrates yet another alternative embodiment suitable for color displays. The principles for reducing contrast are the same, but FIG. 9 illustrates a system that would more typically be used in actual application. In the embodiment of FIG. 9, the light source 10 provides light 12 to a lens 14, which then reflects off of a mirror 372. This mirror 372 reflects the focused light through a lens 374 and into a separating/combining optical system 376, which splits the light into appropriate primary colors, such as red, green, and blue, which are correspondingly directed to a PDLC 378, 380, and 382. Each of these PDLCs creates an image appropriate for one of the primary colors and all are controlled by a controller 384. The image created by the three PDLCs 378, 380, and 382 is then recombined, transmitted through the lens 374, through a polarizer 386 (which doubles the contrast) through an aperture 388, through a third lens 390, and on to a display 392. Using such a system, color operation is possible while simultaneously employing the contrast enhancement according to the invention. Also, after it goes through lens 14, it goes through a polarizing filter 371.

Turning to FIGS. 10 and 11, illustrated are typical display systems in which the polymer dispersed liquid crystal image engine according to the invention would be implemented. In FIG. 10, shown is a simple back reflector projection system D1, in which one of the engines of FIGS. 2–9 is implemented in an image engine 400, and a projected image is reflected off of a back 402 of the display D1 and then on to a surface 404, which corresponds to the projection surface 316. Alternatively, a folded design as illustrated in FIG. 8 could be used, especially because the image is a polarized image. Referring to the previously incorporated copending application entitled "Projecting Images," it will be appreciated that if a polarized image is provided by the image engine 400, that polarized image is first reflected off of a display surface 406, onto a back 408 which includes a retarder, and then back to the display surface 406, where the image has now had its polarization shifted 180° by the retarder of the back 408. Thus, on the second pass, the image is transmitted by the display surface 406.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A projection display engine comprising:

a light source;

a filter adapted to selectively direct light derived from the light source as polarized light, the polarized light comprising one of certain polarization and certain other polarization;

a polymer dispersed liquid crystal display adapted to receive one of the certain polarization and the certain other polarization and to return a polarized image in one of the certain polarization and the certain other polarization, the polarized image being directed as an image to be displayed, some light scattered by the polymer dispersed liquid crystal being blocked from being in the image to be displayed; and a polarization specific reflector disposed in a path of the polarized image and adapted to direct the certain polarization along a first direction and the certain other polarization along a second direction.

2. The projection display engine of claim 1, wherein the polarization specific reflector is adapted to provide the polarized light for imaging.

3. The projection display engine of claim 1, wherein the light source comprises a lamp, and wherein the polarization specific reflector is disposed between the lamp and the polymer dispersed liquid crystal display, the polarization specific reflector adapted to direct the polarized light for imaging.

4. The projection display engine of claim 1, wherein the filter comprises a polarization specific reflecting polarizer.

5. The projection display engine of claim 1, wherein the light source further comprises a lamp adapted to provide the light derived from the light source, wherein the light derived from the light source is divided into the polarized light and other light.

6. The projection display engine of claim 1, further comprising a retarder disposed between the light source and the polymer dispersed liquid crystal display, the retarder adapted to rotate polarization of the polarized image.

7. The projection display engine of claim 1, wherein the polarization specific reflector transmits the polarized light to the polymer dispersed liquid crystal display, and wherein the polarization specific reflector reflects the polarized image.

8. The projection display engine of claim 1, wherein the polarization specific reflector enhances contrast of the image.

9. The projection display engine of claim 1, wherein the filter comprises a polarizer.

10. A projection system comprising:

a light source;

a filter adapted to selectively direct light derived from the light source as polarized light, the polarized light comprising one of certain polarization and certain other polarization;

a polymer dispersed liquid crystal display adapted to receive one of the certain polarization and the certain other polarization and to return a polarized image in one of the certain polarization and the certain other polarization, the polarized image being directed as an image to be displayed, some light scattered by the polymer dispersed liquid crystal being blocked from being in the image to be displayed;

a polarization specific reflector disposed in a path of the polarized image and adapted to direct the certain polarization along a first direction and the certain other polarization along a second direction;

a controller adapted to receive video data, the controller coupled to the polymer dispersed liquid crystal display to provide the image; and a display screen for receiving the image.

11. The projection system of claim 10, wherein the light source comprises a lamp.

12. The projection system of claim 11, wherein the polarization specific reflector is disposed between the lamp and the polymer dispersed liquid crystal display.

13. A method of enhancing the contrast in a display system, the method comprising:

selectively directing light derived from a light source as polarized light in one of certain polarization and certain other polarization;

directing the polarized light to a polymer dispersed liquid crystal display, the polymer dispersed liquid crystal display receiving one of the certain polarization and the certain other polarization;

returning a polarized image in one of the certain polarization and the certain other polarization from the polymer dispersed liquid crystal display, some light scattered by the polymer dispersed liquid crystal blocked from being in the polarized image; and passing the polarized image to a polarization specific reflector for directing the certain polarization along a first direction and the certain other polarization along a second direction.

14. The method of claim 13, further comprising directing the polarized image to a projection surface.

15. The method of claim 13, further comprising providing a lamp for providing the light derived from the light source and disposing the polarization specific reflector between the lamp and the polymer dispersed liquid crystal display.

16. A projection display engine comprising:

a light source;

a polarization specific reflector adapted to reflect certain polarization of light derived from the light source;

a polymer dispersed liquid crystal display adapted to receive a portion of the light derived from the light source and to return a polarized image, all the light for imaging by the polymer dispersed liquid crystal display having the same relative polarization from the polarization specific reflector to the polymer dispersed liquid crystal display; and a filter adapted to selectively direct polarized light from the light derived from the light source, wherein some light scattered by the polymer dispersed liquid crystal display is blocked.

17. The projection display engine of claim 16, wherein the polarization specific reflector comprises a reflecting polarizer.

18. The projection display engine of claim 16, wherein the light source comprises a lamp adapted to provide the light derived from the light source, wherein the light derived from the light source is divided into the polarized light and other light.

19. The projection display engine of claim 16, wherein the polarization specific reflector directs the polarized light to the polymer dispersed liquid crystal display.

20. The projection display engine of claim 16, wherein the polarization specific reflector transmits the polarized light to the polymer dispersed liquid crystal display.

21. The projection display engine of claim 16, further comprising a retarder disposed between the light source and the polymer dispersed liquid crystal display, the retarder adapted to rotate polarization of the polarized image.

22. The projection display engine of claim 16, wherein the polarization specific reflector transmits the polarized light to the polymer dispersed liquid crystal display, and wherein the polarization specific reflector reflects the polarized image.

23. The projection display engine of claim 16, wherein the filter comprises a reflecting polarizer.

24. The projection display engine of claim 16, wherein the filter comprises a polarizer.

25. A method of enhancing contrast in a display system, the method comprising:
  providing polarized light from a light source having a polarization specific reflector that reflects certain polarization;
  directing the polarized light to a polymer dispersed liquid crystal display;
  reflecting, in a single pass by the polarization specific reflector, all the polarized light for imaging by the polymer dispersed liquid crystal display;
  returning a polarized image from the polymer dispersed liquid crystal display; and
  passing the polarized light through a polarization selective filter to filter out light polarizations other than the polarization meant for the polarized image.

26. The method of claim 25, further comprising directing the polarized image to a projection surface.

27. The method of claim 25, wherein the reflecting comprises reflecting before the polymer dispersed liquid crystal display.

28. The method of claim 25, wherein the reflecting comprises reflecting after the polymer dispersed liquid crystal display.

29. The method of claim 25, wherein the passing comprises passing before the polymer dispersed liquid crystal display.

30. The method of claim 25, wherein the passing comprises passing after the polymer dispersed liquid crystal display.

* * * * *